United States Patent
Ma et al.

(10) Patent No.: US 12,371,983 B2
(45) Date of Patent: Jul. 29, 2025

(54) LARGE-SCALE CARBON-MINERALIZATION THROUGH OXALATIZATION

(71) Applicant: THE CURATORS OF THE UNIVERSITY OF MISSOURI, Columbia, MO (US)

(72) Inventors: Hongyan Ma, Rolla, MO (US); Wenyu Liao, Rolla, MO (US)

(73) Assignee: The Curators of the University of Missouri, Columbia, MO (US)

(*) Notice: Subject to any disclaimer, the term of this patent is extended or adjusted under 35 U.S.C. 154(b) by 0 days.

(21) Appl. No.: 18/681,569

(22) PCT Filed: Aug. 15, 2022

(86) PCT No.: PCT/US2022/040355
§ 371 (c)(1),
(2) Date: Feb. 6, 2024

(87) PCT Pub. No.: WO2023/019020
PCT Pub. Date: Feb. 16, 2023

(65) Prior Publication Data
US 2024/0368975 A1 Nov. 7, 2024

Related U.S. Application Data

(60) Provisional application No. 63/232,939, filed on Aug. 13, 2021.

(51) Int. Cl.
*E21B 43/28* (2006.01)
(52) U.S. Cl.
CPC .................... *E21B 43/28* (2013.01)

(58) Field of Classification Search
CPC .............................. Y02P 20/151; Y02C 20/40
See application file for complete search history.

(56) References Cited

U.S. PATENT DOCUMENTS 4,408,664 A * 10/1983 Santee .................. E21B 43/164
166/402
8,899,331 B2 12/2014 Burnham et al.
(Continued)

OTHER PUBLICATIONS

Vehmaanperä; "Formation of Humboldtine During the Dissolution of Hematite in Oxalic Acid—Density Functional Theory (DFT) Calculations and Experimental Verification"; Clays and Clay Minerals; vol. 69, No. 6; Oct. 1, 2021; p. 655-662. (Year: 2021).*
(Continued)

*Primary Examiner* — Andrew Sue-Ako
(74) *Attorney, Agent, or Firm* — HOVEY WILLIAMS LLP

(57) ABSTRACT

The present invention is broadly concerned with mineralization methods that assist in permanent carbon storage. The methods provide a storage mechanism for oxalic acid generated by existing or future-developed carbon capture and conversion methods that convert CO2 to oxalic acid. That oxalic acid can be injected into a subsurface rock formation containing non-carbonate rock to form oxalates or oxalate hydrates. Alternatively, oxalic acid can be mixed with mine tailings, well drilling dirt, crushed rocks, etc., that contain desired non-carbonate rock minerals, to promote mineralization.

22 Claims, 9 Drawing Sheets

(56) References Cited

U.S. PATENT DOCUMENTS

2008/0296146 A1 12/2008 Toulhoat et al.
2009/0301352 A1* 12/2009 Constantz ............ B01D 53/62
106/668

OTHER PUBLICATIONS

Woddall; "Tuning acid extraction of magnesium and calcium from platinum group metal tailings for CO2 conversion and storage"; RSC Sustainability; vol. 2; Sep. 30, 2024; p. 3320-3333. (Year: 2024).*

Acidizing Briefing Paper, Treatment in Oil and Gas Operators, 2014, American Petroleum Institute (API), Digital Media, DM2014-113, 05.14, 5 pages.

Michigan Technological University, "Captured carbon dioxide converts into oxalic acid to process rare earth elements," ScienceDaily. ScienceDaily, Feb. 22, 2019. <www.sciencedaily.com/releases/2019/02/190222143339.htm>, 7 pages.

Buijse et al., "Organic Acids in Carbonate Acidizing," Aug. 2004, SPE Production & Facilities, 19(3):128-134, DOI:10.2118/82211-PA, abstract only, 2 pages.

Power et al., "Carbon Mineralization: From Natural Analogues to Engineered Systems," Reviews in Mineralogy & Geochemistry, vol. 77, pp. 305-360, 2013, 56 pages.

Romanov et al., "Mineralization of Carbon Dioxide: Literature Review," U.S. Department of Energy and AECOM, undated, 53 pages.

Schuler et al., "Towards Sustainable Oxalic Acid from CO2 and Biomass," ChemSusChem 2021, 14, 3636-3664, 29 pages.

Kelemen et al., "An Overview of the Status and Challenges of CO2 Storage in Minerals and Geological Formations," Frontiers in Climate, Nov. 2019, vol. 1, Article 9, 20 pages.

International Search Report and Written Opinion mailed Oct. 27, 2022 in corresponding PCT/US2022/040355, 18 pages.

Wovkulich, Karen, "Laboratory and Field Studies Directed toward Accelerating Arsenic Remediation at a Major US Superfund Site in New Jersey," Submitted in partial fulfillment of the requirements for the degree of Doctor of Philosophy in the Graduate School of Arts and Sciences, Columbia University, 2011, 46 pages.

Lee et al., "Effect of Oxalic Acid on Heat Pretreatment for Serpentine Carbonation," Materials Transactions, vol. 52, No. 2 (2011) pp. 235 to 238, 4 pages.

International Preliminary Report on Patentability dated Feb. 13, 2024 in corresponding PCT/US2022/040355, 9 pages.

Luo et al., "Preparation and characterization of ferrous oxalate cement—A novel acid-base cement," J Am Ceram Soc. 2021; 104:1120-1131, DOI: 10.1111/jace.17511, 12 pages.

* cited by examiner

LARGE-SCALE CARBON-MINERALIZATION THROUGH OXALATIZATION

RELATED APPLICATIONS

The present application claims priority to PCT International Patent Application No. PCT/US2022/040355, filed Aug. 15, 2022, which claims the priority benefit of U.S. Provisional Patent Application Ser. No. 63/232,939, filed Aug. 13, 2021, entitled LARGE-SCALE CARBON-MINERALIZATION THROUGH "OXALATIZATION," each of which is incorporated by reference herein in their respective entireties.

BACKGROUND

Field

The present disclosure relates to a mineralization method that can be used to aid with permanent carbon storage.

Description of Related Art $CO_2$ has been proven to be the primary driver of climate change. During the last 800,000 years, atmospheric $CO_2$ concentrations of 172 ppm to 300 ppm tracked the glacial periods and relatively warm interglacial periods. Global anthropogenic $CO_2$ emissions from burning fossil fuels and other industrial processes have been increasing steadily and reached a record high of 36.44 billion metric tons per year in 2019. Despite a slight decrease in 2020 due to COVID-19 and global efforts in emission control, the overall trend of increase (at ~0.5%-2% per year) will continue for the foreseeable future The emissions have resulted in an atmospheric $CO_2$ concentration reaching ~420 ppm in 2021, and this number has not been higher than 300 ppm in the last 800,000 years.

Many carbon capture, utilization, and storage ("CCUS") techniques have been proposed for carbon emission control. In these techniques, carbon capture using various solvents, membrane, and physical methods is an intermediate step for $CO_2$ source purification instead of a final problem solver, since the captured $CO_2$ has to be used or stored through particular pathways. For carbon utilization, the $CO_2$ can be converted chemically, biochemically, or electrochemically into fuel, food, fodder, high-value chemicals, and polymer/plastics. However, most of these technologies still have technical deficiencies and risks, represented by their low-energy efficiency. Nevertheless, it is broadly believed that some of these technologies (e.g., converting $CO_2$ into oxalic/formic acid, and further into polymers) will become techno-economically feasible following the large-scale deployment of renewable (e.g., solar) energy. Two facts will limit the overall efficiency of these technologies for global carbon emission control: (1) Some of the target commodities (e.g., fuel and fodder) represent only temporary carbon storage, and their consumptions re-release the stored $CO_2$; and (2) Humanity's demand for these commodities is far below the scale of $CO_2$ that needs to be removed. While these conversion-and-utilization technologies are at low technology readiness levels ("TRLs"), the currently largest market for $CO_2$ utilization might be concrete. The concrete technologies have the potential to mineralize $CO_2$ at a scale of multiple tons, while other low-TRL technologies are only able to demonstrate at kg-scale. However, these concrete technologies also have obvious limitations—their full-scale $CO_2$ uptake capacity. One technology is only suitable for a part of the prefabrication market (e.g., blocks), and the other technology, although suitable for ready-mix applications, has a $CO_2$ uptake limit of 0.2% by weight of cement in order to avoid performance degradation. So, even if all cement—4.5 Gt/year—is treated by the ready-mix application, the total direct $CO_2$-reduction capacity is only 9 Mt/year.

Amongst current CCUS techniques, only geological storage techniques have sufficient capacity (i.e., at a Gt level) to address the grand challenge being faced. However, in many options including hydrocarbon reservoirs, saline aquifers, coals seams, salt caverns, oil/gas shale, and ocean, the mechanisms rely on structural/stratigraphic traps or dissolving $CO_2$ in water/saline brines; in both cases, the $CO_2$ remains in fluid/supercritical phase, which keeps it mobile and susceptible to leakage. Geological carbon mineralization, especially in situ mineralization in mafic/ultramafic rocks, seems to be the only stable and large-scale solution to deal with the challenge of $CO_2$ reduction. For example, in one $CO_2$ geological mineralization project in Iceland, ~71,000 metric tons of $CO_2$ have been injected into a local olivine tholeiite basalt formation (400-800 m deep, 15-35° C., and pH=8.4-9.8) since 2014. These very specific geological conditions favor carbon mineralization, and field data and modeling predict complete mineralization within 10 years. However, implementation of this strategy is likely to be limited in many geographical regions by slow kinetics of direct carbonation of the rocks because of unfavorable geological conditions.

In summary, none of currently available and emerging technologies are technically perfect or can be deployed at a sufficiently large scale to address the challenge of carbon emission control. Therefore, novel breakthrough technologies are urgently needed.

SUMMARY

The present disclosure provides a mineralization method named "oxalatization," as an alternative to carbonation-based mineralization.

In one embodiment, that method comprises contacting oxalic acid with a component chosen from non-carbonate rocks, non-carbonate minerals, or mixtures thereof under conditions to cause formation of one or both of a metal oxalate or metal oxalate hydrate.

In a further embodiment, the disclosure further provides a system for contacting oxalic acid with a component chosen from non-carbonate rocks, non-carbonate minerals, or mixtures thereof under conditions to cause formation of one or both of a metal oxalate or metal oxalate hydrate.

In yet another embodiment, the disclosure provides reaction products formed by contacting oxalic acid with a component chosen from non-carbonate rocks, non-carbonate minerals, or mixtures thereof under conditions to cause formation of one or both of a metal oxalate or metal oxalate hydrate.

DETAILED DESCRIPTION

Figure 1:
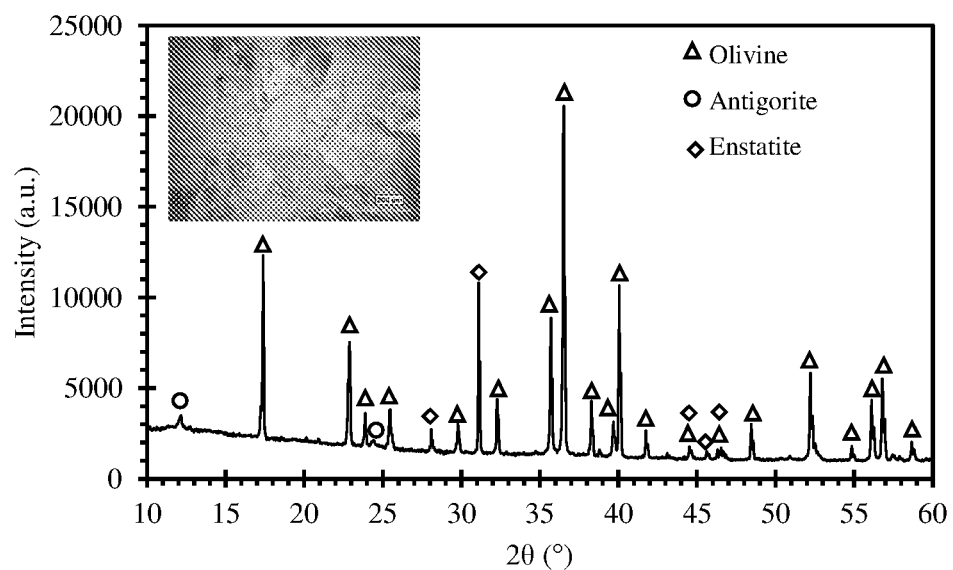
FIG. 1 is a graph of the X-ray diffraction ("XRD") pattern of dunite, as described in Example 1.

The present disclosure addresses the needs of the prior art by providing rapid mineralization methods that present an additional storage option for $CO_2$. The method broadly involves contacting oxalic acid with a non-carbonate rock, non-carbonate mineral, or a mixture thereof under conditions to cause formation of one or both of a metal oxalate or metal oxalate hydrate (and even carbonate). The oxalic acid is preferably derived from captured (or low-concentration point source, e.g., flue-gas-borne) $CO_2$, which can be converted to oxalic acid via four main pathways:

(a) through direct conversion of $CO_2$ to an alkali oxalate;
(b) through a metal formate intermediate, which can be obtained from the electrocatalytic or photocatalytic reduction of $CO_2$;
(c) via CO and the dialkyl oxalate process; or
(d) via ethylene glycol and subsequent oxidation (in practice not done because ethylene glycol would be obtained from oxalic acid, not vice versa).

There are also biological pathways that are feasible and highly-scalable to convert biomass (growth of which removes $CO_2$ from atmosphere) into oxalic acid. One example is through fermentation using the fungus *Aspergillus niger*.

Regardless of how the oxalic acid is formed, in one embodiment it can be injected into a rock formation, which could be a surface or subsurface formation. The oxalic acid can be injected as part of an aqueous solution. In this embodiment, the solution will typically be an approximately 0.1 M to about 2 M oxalic acid solution, more preferably about 0.5 M to about 1.7 M oxalic acid solution, and even more preferably about 0.9 M to about 1.6 M oxalic acid solution.

In other embodiments, oxalic acid is co-injected with liquified $CO_2$.

In yet another embodiment, the oxalic acid can be mixed with mine tailings, well-drilling dirt, crushed non-carbonate minerals/rocks (e.g., from minerals and/or rocks that were excavated and crushed specifically for the purpose of mixing with oxalic acid as described herein), or a mixture thereof. As used herein, mine tailings refers to the materials remaining after the process of separating the valuable/target commodity. These materials typically include processed rock and/or soil. In this embodiment, the solution will typically be an approximately 0.1 M to about 2 M oxalic acid solution, more preferably about 0.5 M to about 1.7 M oxalic acid solution, and even more preferably about 0.9 M to about 1.6 M oxalic acid solution.

Regardless of whether injection or physical mixing is the method of contact, the target rock and/or mineral is preferably a non-carbonate rock or mineral. Carbonate minerals are minerals comprising significant levels of metal carbonates, e.g., calcite, aragonite, gaspéite, magnesite, otavite, rhodochrosite, siderite, smithsonite, spherocobaltite, etc. Carbonate rocks comprise a significant level of carbonate mineral(s). Non-carbonate minerals and non-carbonate rocks comprise less than about 40% by weight metal carbonates, preferably less than about 30% by weight metal carbonates, more preferably less than about 20% by weight metal carbonates, and even more preferably less than about 10% by weight metal carbonates, based on the weight of the mineral or rock to be treated with oxalic acid as described herein.

1. Minerals

Preferred non-carbonate minerals comprise alkaline earth metals (e.g., Ca, Mg) and/or transition metals (e.g., Fe and Cu). In one embodiment, non-carbonate minerals comprise silicates or aluminosilicates of alkaline earth metals and/or transition metals. Oxides of one or more of the foregoing metals are particularly suitable minerals for contacting with oxalic acid.

In one embodiment, the target mineral comprises at least about 30% by weight, preferably at least about 35% by weight, more preferably at least about 40% by weight, and even more preferably at least about 45% by weight total oxides of one or more of the foregoing metals, based on the weight of the mineral to be treated with oxalic acid. In a preferred embodiment, the foregoing levels are achieved by the combination of magnesium oxide, calcium oxide, and iron oxide present in the mineral. In another embodiment, the foregoing levels are achieved by the combination of magnesium oxide and iron oxide present in the mineral.

In another embodiment, the mineral comprises at least about 20% by weight magnesium oxide, preferably at least about 30% by weight magnesium oxide, and more preferably at least about 40% by weight magnesium oxide, based on the total mineral weight. In a further embodiment, the mineral comprises at least about 8% by weight iron oxide, preferably at least about 12% by weight iron oxide, and more preferably at least about 15% by weight iron oxide, based on the total mineral weight. In yet another embodiment, the mineral will comprise magnesium oxide and iron oxide in any combination of the foregoing ranges.

The non-carbonate mineral will also typically comprise a metalloid such as Si, typically in oxide form. The total $SiO_2$ levels are preferably less than about 65% by weight, preferably less than about 60% by weight, and more preferably less than about 55% by weight, based on the total weight of the mineral.

Examples of suitable non-carbonate minerals for use in the methods described herein include those chosen from plagioclase, olivine (e.g., forsterite, fayalite), pyroxenes (e.g., hypersthene), amphiboles, glauconite, serpentine, dunite, hematite, other similar minerals or mixtures thereof.

2. Rocks

In one embodiment, the non-carbonate rocks are chosen from mafic, ultramafic, or hybrids thereof. Preferred non-carbonate rocks comprise one or more of the minerals described above, preferably at sufficient levels to provide at least about 20% by weight, preferably at least about 25% by weight, and more preferably at least about 30% by weight total oxides of alkaline earth, transition, and/or post-transition metals, based on the total rock weight. In another embodiment, the non-carbonate rock comprises at least about 8% by weight, preferably at least about 10% by weight, more preferably at least about 12% by weight, and even more preferably at least about 15% by weight of oxides of magnesium and iron, based on the total rock weight.

The total $SiO_2$ levels in the non-carbonate rocks are generally less than about 60% by weight, preferably less than about 55% by weight, more preferably less than about 50% by weight, and even more preferably less than about 45% by weight, based on the total weight of the rock. Examples of suitable non-carbonate minerals for use in the methods described herein include those chosen from basalt, peridotite, or mixtures thereof.

3. Process Conditions

As noted previously, oxalic acid can be contacted with the rock and/or mineral by injection or physical mixing. Advantageously, the method rapidly achieves high oxalic acid conversation under a variety of temperature conditions.

In more detail, the contacting can be carried out at temperatures of about 10° C. to about 80° C., preferably about 15° C. to about 70° C., and even more preferably about 20° C. to about 60° C., making it suitable for use both in situ (e.g. subsurface injection) and ex situ (e.g., with mine tailings).

For ex situ, the oxalic acid is preferably mixed at a molar ratio of oxalic acid to total metal oxide in the component of about 1:20 to about 1:1, more preferably about 1:10 to about 1:1, and even more preferably about 1:2 to about 1:1.

The oxalic acid will accelerate dissolution of the rocks and minerals it contacts, releasing metals ions (e.g., $Ca^{2+}$, $Mg^{2+}$, $Fe^{2+}$) into solution, thus forming insoluble oxalates and/or oxalate hydrates of the previously described alkaline earth metals and/or transition metals. Reaction products include magnesium oxalate dihydrate, ferrous oxalate dihydrate, calcium oxalate monohydrate, other oxalate hydrates, or mixtures thereof.

The selected/representative mineralization reactions can be written as:

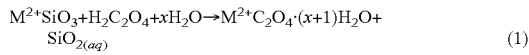

$$M^{2+}SiO_3 + H_2C_2O_4 + xH_2O \rightarrow M^{2+}C_2O_4 \cdot (x+1)H_2O + SiO_{2(aq)} \quad (1)$$

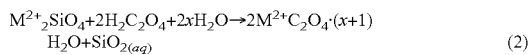

$$M^{2+}{}_2SiO_4 + 2H_2C_2O_4 + 2xH_2O \rightarrow 2M^{2+}C_2O_4 \cdot (x+1)H_2O + SiO_{2(aq)} \quad (2)$$

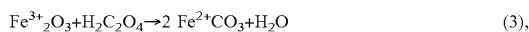

$$Fe^{3+}{}_2O_3 + H_2C_2O_4 \rightarrow 2\,Fe^{2+}CO_3 + H_2O \quad (3),$$

where $M^{2+} = Ca^{2+}$, $Mg^{2+}$, $Fe^{2+}$ or other alkaline earth and transition metals; x equals zero or 1; $SiO_{2(aq)}$ can be $H_4SiO_4$ (aqueous silicic acid), any of its acid dissociation products, or precipitated silica minerals or amorphous gels.

As noted previously, the reaction will proceed rapidly as compared to prior art carbonation processes. For example, in one embodiment, at least about 75% by weight of the total metal oxides present in the starting rock or mineral will be converted to a metal oxalate and/or metal oxalate hydrate. Preferably, this conversion rate will be at least about 80% by weight, and more preferably at least about 85% by weight. In one embodiment, the foregoing conversion rate will be achieved within about 30 days or fewer, preferably within about 15 days or fewer, and even more preferably within about 7 days or fewer.

In another embodiment, about 50% by weight of the total magnesium oxide present in the starting rock or mineral will be converted to magnesium oxalate and/or magnesium oxalate hydrate. Preferably, this conversion rate will be at least about 60% by weight, more preferably at least about 75% by weight, and even more preferably at least about 85% by weight. In one embodiment, the foregoing conversion rate will be achieved within about 7 days or fewer, preferably within about 4 days or fewer, and even more preferably within about 36 hours or fewer.

It will be appreciated that there are a number of advantages presented by the disclosed method. For example, oxalic acid has a much higher solubility in water than $CO_2$ (i.e., ~90-100 g/L vs ~1.8 g/L, at 20° C. and one atmospheric pressure). This >50-fold higher solubility allows a greater amount of oxalate to be contained in the reactant solution (ex situ) or reservoir water (in situ), thus promoting the mineralization reactions.

The mineralization mechanisms work effectively with both oxalate and carbonate minerals potentially precipitating together in close proximity in redox transition zones. Additionally, given the same amount of metal oxide (MO), forming oxalates ($MC_2O_4$) has a higher (i.e., double) molar carbon uptake capacity than the prior art methods of forming carbonates ($MCO_3$).

Further, dissolution of oxalic acid in water yields a solution with a density >1.0 g/cm³. This density is similar to that of formation water, and these two phases can thus be mixed easily, allowing uniform mineralization in the formation (in situ).

Additional advantages of the various embodiments will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments but is not necessarily included. Thus, the present disclosure encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

EXAMPLES

The following examples set forth methods in accordance with the disclosure. It is to be understood, however, that these examples are provided by way of illustration, and nothing therein should be taken as a limitation upon the overall scope.

Example 1

Mineral/Rock Characterization

Two ultramafic rocks (dunite and iron-rich dunite) that are both rich in olivine, and one mafic rock (basalt) were selected for characterization in this Example. The rock samples were supplied by the online stores Teton Supply Co., NorthernWestStuff, and Beakers World, respectively.

1. Chemical Composition

The respective chemical composition of each test rock or mineral was examined by X-Ray Fluorescence ("XRF"). The rock samples were pulverized to <20 μm powders and pressed into pellets for the XRF tests, which were performed by a Rigaku Supermini 200 X-Ray Fluorescence Spectrometer). Table 1 provides these results, with the chemical compositions being presented in the form of oxides.

$(CaMgSi_2O_6)$, olivine $((Mg, Fe^{2+})_2SiO_4)$, quartz $(SiO_2)$, and iron oxide $(Fe_3O_4)$. Combined with the XRF analysis in the last section, the XRD results confirm the dunite, iron-rich dunite, and basalt have olivine contents in descending order, while iron-rich dunite and basalt have large contents of magnesian ferrosilite and plagioclase, respectively. The variations of compositions in the three rock samples make them good representatives to different types of ultramafic/mafic rocks.

3. Solubility Patterns

The solubility patterns of oxalic acid $(C_2H_2O_4)$, minerals, and oxalates are particularly important since oxalic acid and minerals are the reactants and oxalates are the major products. Their respective solubilities indicate how much will remain in solution after reactions instead of precipitating, prior to reaching saturation levels. Table 2 depicts the solubility of oxalic acid as a function of temperature. The higher the temperature, the higher the oxalic acid concentration in water achieved, and the more oxalic acid can be dissolved in the water for the oxalating reaction. Most ultramafic/mafic minerals/rocks and oxalates have very low solubilities in water. For example, magnesium oxalate's $(MgC_2O_4)$ solubility in water is 0.038 g/100 ml at 25° C., and the solubility product $(K_{sp})$ is $8.5 \times 10^{-5}$ for $MgC_2O_4$. Thus, it can be concluded that the vast majority of minerals and oxalates will precipitate stably as mineralization products in natural conditions.

TABLE 2

| Oxalic acid solubility data with temperature. | |
| --- | --- |
| Temperature (° C.) | Solubility (g/L in water) |
| 10 | 57.2 |
| 20 | 95.5 |

TABLE 1

| Chemical compositions of the dunite, iron-rich dunite, and basalt. | | | | | | | | | | | | | |
| --- | --- | --- | --- | --- | --- | --- | --- | --- | --- | --- | --- | --- | --- |
| Rocks | Na$_2$O | MgO | Al$_2$O$_3$ | SiO$_2$ | P$_2$O$_5$ | SO$_3$ | K$_2$O | CaO | TiO$_2$ | Cr$_2$O$_3$ | Mn$_2$O$_3$ | Fe$_2$O$_3$(T)* | LOI |
| Dunite | 0.2 | 43.1 | 1.3 | 44.8 | 0.0 | 0.1 | 0.0 | 0.0 | 0.0 | 0.4 | 0.2 | 9.8 | 0.9 |
| Iron-rich dunite | 0.1 | 23.4 | 2.3 | 54.6 | 0.0 | 0.1 | 0.0 | 0.7 | 0.0 | 1.0 | 0.3 | 17.3 | 1.0 |
| Basalt | 3.9 | 3.5 | 18.1 | 52.4 | 0.7 | 0.0 | 5.0 | 5.8 | 0.8 | 0.1 | 0.2 | 9.2 | 1.2 |

*Fe(II)/Fe(III) was reported as Fe$_2$O$_3$ for total.

The ultramafic rocks of dunite and iron-rich dunite are both dominated by MgO, SiO$_2$, and Fe$_2$O$_3$. The difference between them is that iron-rich dunite has much more Fe$_2$O$_3$ (/FeO) but less MgO. In contrast, the mafic rock of basalt has similar content of SiO$_2$ but much lower MgO content and significantly higher CaO and Al$_2$O$_3$ contents as compared to the dunite and iron-rich dunite.

2. Phase Identification

The existing phases of the major compositions of dunite, iron-rich dunite, and basalt were identified by XRD. The samples were pulverized to <20 μm powder for the XRD tests. The XRD tests were implemented by a PANalytical X'Pert Pro Multi-Purpose Diffractometer. The testing results are shown in FIGS. 1 (dunite), 2 (iron-rich dunite), and 3 (basalt). The dunite is composed of three major minerals of olivine $((Mg, Fe^{2+})_2SiO_4)$, antigorite $((Mg,Fe^{2+})_3Si_2O_5(OH)_4)$, and enstatite $(MgSiO_3)$. The iron-rich dunite is mainly consisted of two minerals of olivine $((Mg, Fe^{2+})_2SiO_4)$ and magnesian ferrosilite $((Fe^{2+},Mg)SiO_3)$. The basalt is formed by plagioclase $((Ca, Na)(Al, Si)_2Si_2O_8)$, pyroxene TABLE 2-continued

| Oxalic acid solubility data with temperature. | |
| --- | --- |
| Temperature (° C.) | Solubility (g/L in water) |
| 30 | 139 |
| 40 | 217 |
| 50 | 315 |
| 60 | 426 |

Example 2

Carbon Mineralization Through Oxalatization of Dunite

Figure 4:
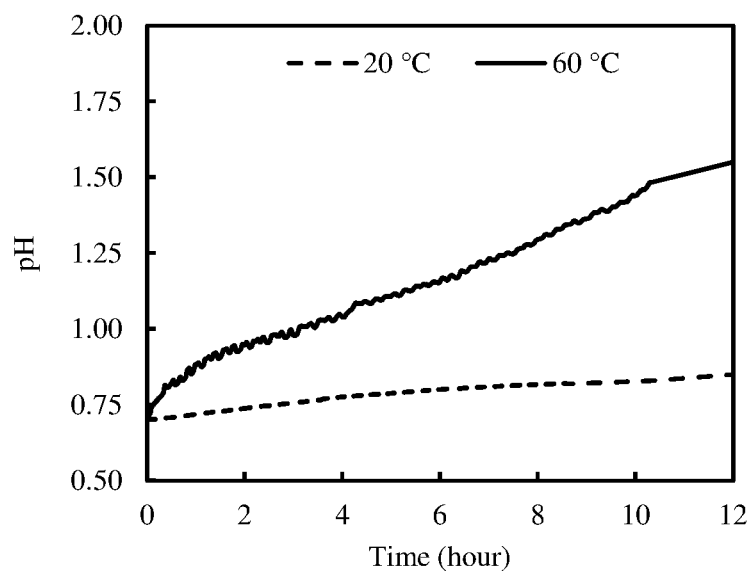
FIG. 4 depicts a graph of pH variations during the reaction of dunite and an oxalic acid solution at 20° C. and 60° C. (Example 2)

The reaction of dunite (rich in olivine and other magnesium and ferrous silicates) and oxalic acid solution was investigated to elucidate the interaction mechanism between the two in carbon mineralization. Test samples were prepared by adding 10 g of dunite powder (obtained from Teton Supply Co.) to 105 mL 1 M oxalic acid solution. Samples were tested at reaction temperatures of 20° C. and 60° C., with the lower temperature being representative of those that would be encountered during ex situ oxalatization applications (e.g., processing tailings in the mining industry) and the higher temperature being representative of those that would be encountered during in situ geological subsurface carbon mineralization applications. The pH of the solution was monitored for 12 hours, as shown in FIG. 4. Then, the solids and supernatant of the reaction solution were separated by filtering with 0.2 μm opening nylon membrane filter, and the solids were further dried in a 60° C. vacuum oven for three days.

Figure 5:
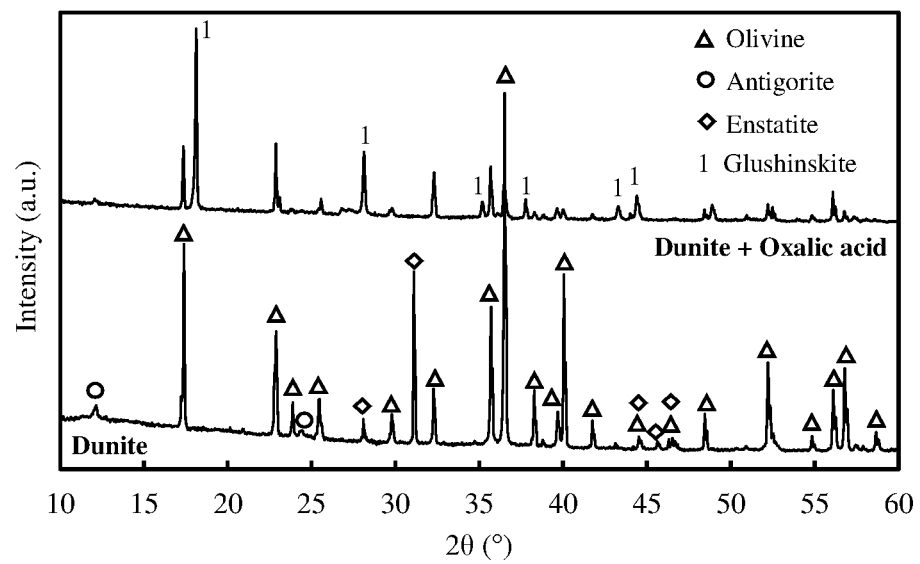
FIG. 5 is a graph of the XRD pattern of dunite before and after interaction with the oxalic acid solution as described in Example 2.
Figure 6:
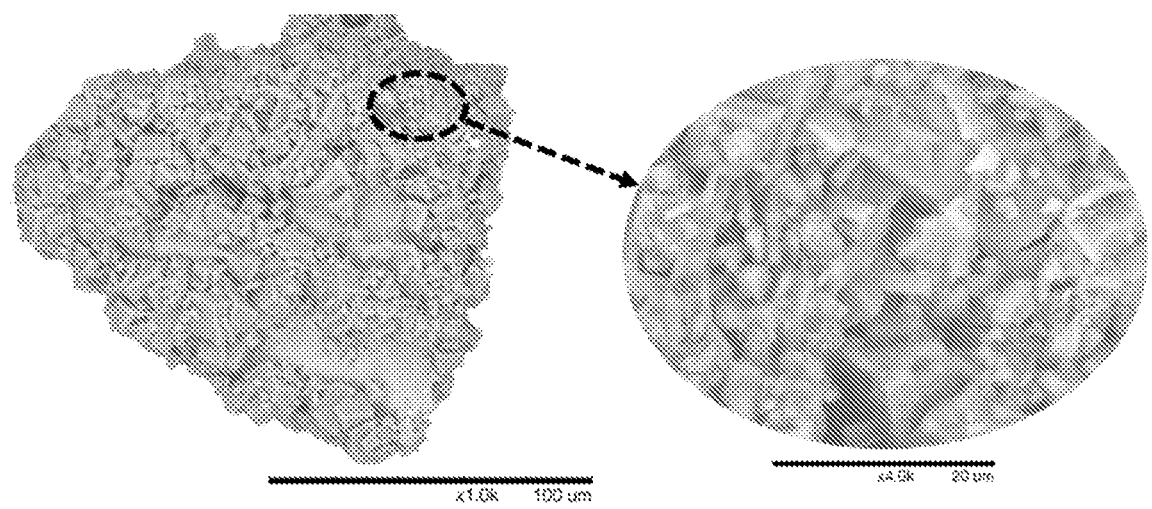
FIG. 6 provides scanning electron microscope ("SEM") images of the glushinskite obtained from the reaction of dunite and an oxalic acid solution (Example 2)

The reaction yielded glushinskite, which was confirmed by further testing. In one of those tests, XRD of the resulting solid was carried out by a PANalytical X'Pert Pro Multi-Purpose Diffractometer and compared to the dunite XRD obtained in Example 1. FIG. 5 shows the glushinskite XRD pattern as compared to the dunite XRD pattern from FIG. 1. It clearly manifests the major reaction product from the reaction of dunite and oxalic acid solution is glushinskite. SEM images were also taken of the resulting solid. FIG. 6 shows the morphologies of the glushinskite product on the surface of a dunite grain and a close-up image.

These experiments clearly indicated that the interaction between dunite and oxalic acid solution could be observed within several hours, which is much faster than prior art carbonation. Higher temperatures would likely accelerate the oxalatization process significantly. Glushinskite (magnesium oxalate dihydrate, $MgC_2O_4 \cdot 2H_2O$) is one of the major products that would precipitate on the surfaces of dunite grains, as evidenced by these results.

Figure 7:
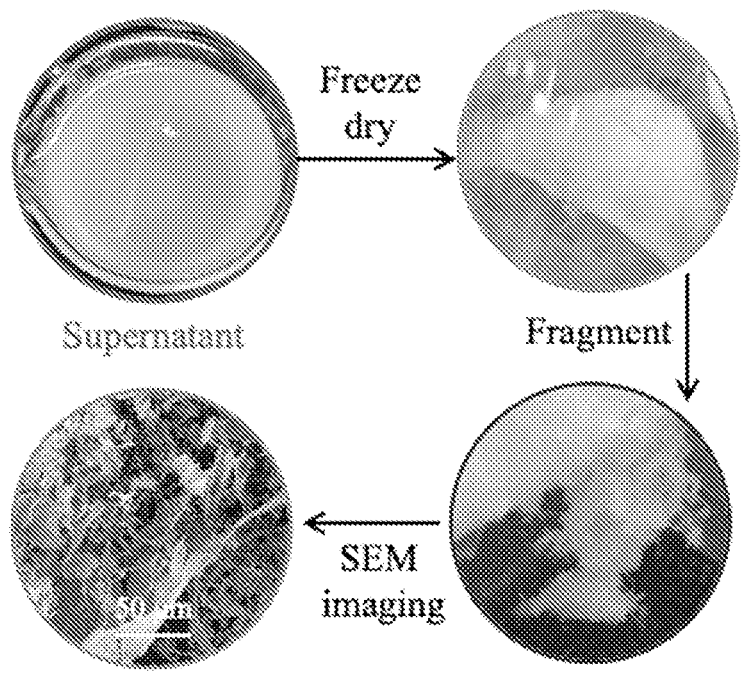
FIG. 7 shows the process used to characterize the amorphous silica suspended in the reaction solution and the SEM image (1500×) of that amorphous silica (Example 2)
Figure 8:
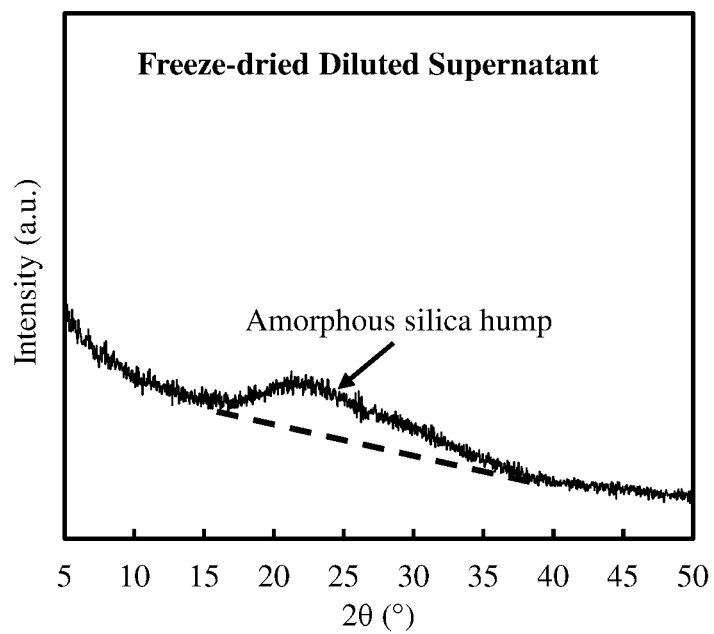
FIG. 8 is a graph of the XRD pattern of the amorphous silica that was suspended in the reaction solution (Example 2)

Amorphous silica was also a major product and was found in the supernatant separated from the reaction solution. It was suspended in the reaction solution due to its nano-scale size. After freeze drying the supernatant by a Labconco FreeZone 4.5 Liter Benchtop Freeze Dryer, a white foam piece was obtained. It could be fragmented by tweezer easily and loaded onto the sample holder for SEM imaging. FIG. 7 provides photographs of this process and also shows an SEM image that was taken of the fragmented product. The SEM of the freeze-dried supernatant revealed a filamentous structure, which was made of silica and oxalic acid dihydrate based on the elementary analyses under SEM. To confirm the existence of amorphous silica, the isopropanol alcohol was used to dissolve the oxalic acid dihydrate from the freeze-dried supernatant, then the rest of the freeze-dried supernatant was obtained by filtering with a 0.2 μm opening nylon membrane filter and dried in a 60° C. oven. The presence of amorphous silica in the oven-dried solid was determined by XRD test, using a PANalytical X'Pert Pro Multi-Purpose Diffractometer. The XRD pattern is shown in FIG. 8, where the amorphous silica hump can clearly be observed.

There was a possibility that some amorphous silica coexisted with the glushinskite but was too small to be imaged by SEM. Considering the high reactivity of amorphous silica gel, the silica obtained from this type of oxalatization could be separated and further processed to produce commodity silica in the case of ex situ mineralization, or co-precipitated in the case of in situ mineralization.

Figure 9:
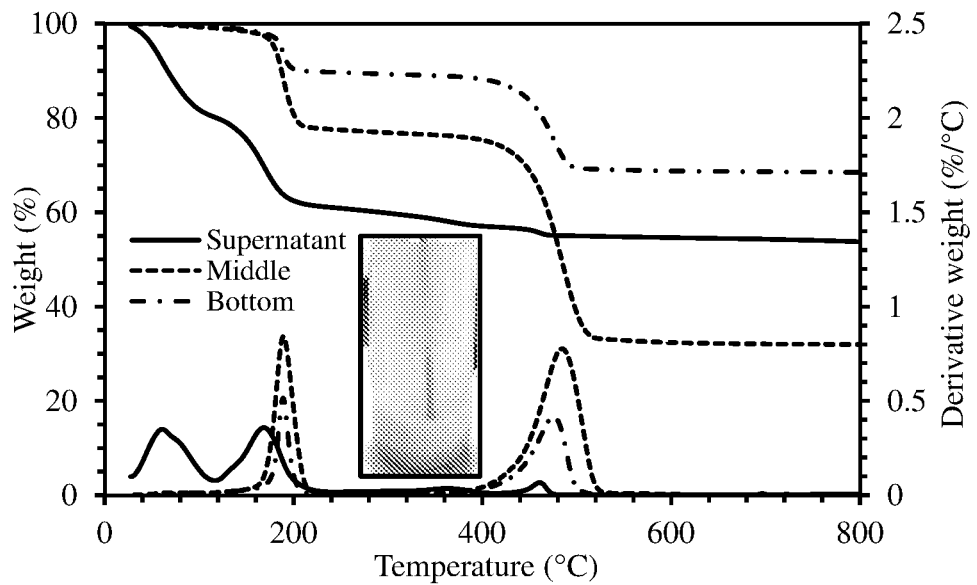
FIG. 9 depicts the thermogravimetric analysis curves of the solids from the supernatant, middle, and bottom portions of the aqueous dunite+oxalic acid solution (Example 2)

Thermogravimetric analysis was carried out on the solids obtained from the supernatant, middle, and bottom portions of the dunite+oxalic acid aqueous reaction solution. The three portions were separated and acquired from the reaction solution by the means of centrifuging at 3,500 rpm for 1 hour by a TC-Spinplus-6 Centrifuge, filtering by 0.2 μm opening nylon membrane filter, and drying in a 60° C. vacuum oven. The resulting TG/DTG curves (FIG. 9) confirmed the chemical compositions in dunite as they have different decomposition temperatures as shown in Equations (4a), (4b), (5a), and (5b). Combined with the above XRD analyses, the solids from supernatant are oxalic acid dihydrate and silica, the solid from middle portion is dominated by glushinskite, the solids in the bottom portion are glushinskite and unreacted dunite.

$$C_2H_2O_4 \cdot 2H_2O \xrightarrow{\Delta} C_2H_2O_4 + 2H_2O\uparrow \quad (@ < 120° C.) \quad (4a)$$

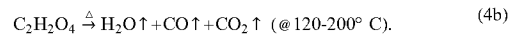
$$C_2H_2O_4 \xrightarrow{\Delta} H_2O\uparrow + CO\uparrow + CO_2\uparrow \quad (@ 120\text{-}200° C). \quad (4b)$$

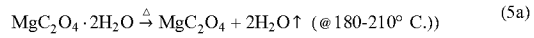
$$MgC_2O_4 \cdot 2H_2O \xrightarrow{\Delta} MgC_2O_4 + 2H_2O\uparrow \quad (@ 180\text{-}210° C.)) \quad (5a)$$

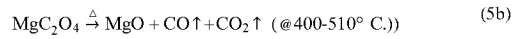
$$MgC_2O_4 \xrightarrow{\Delta} MgO + CO\uparrow + CO_2\uparrow \quad (@ 400\text{-}510° C.)) \quad (5b)$$

Moreover, there was a weight gain of 7.2 g for dunite from the oxalic acid solution after 24 hours, due to the formation of glushinskite. Given that there was 43% MgO in the dunite (see Table 1), the weight gain suggested a conversion rate of 63% magnesium oxide to magnesium oxalate dihydrate, which is much faster than carbonation-based mineralization reactions of the same minerals in the relevant environment. As oxalatization was observed to be ongoing after 24 hours, the conversion rate could be higher with a longer duration.

Example 3

Carbon Mineralization Through Oxalatization of "Iron-Rich Dunite"

Figure 10:
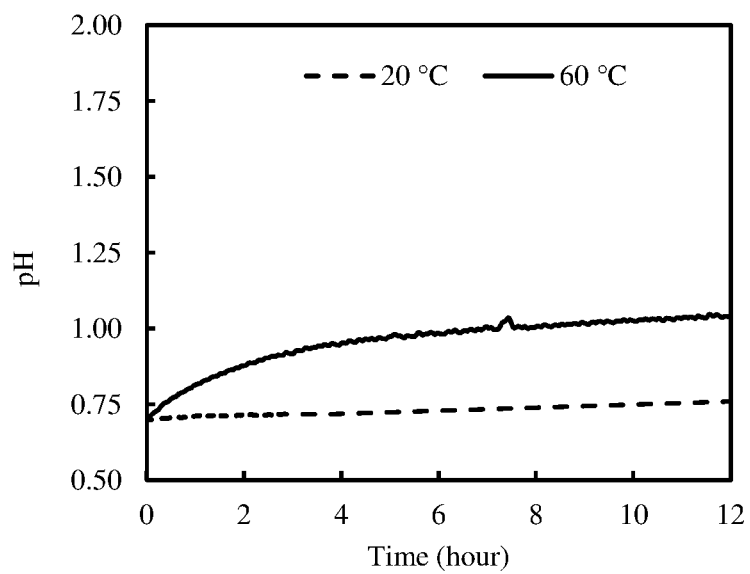
FIG. 10 depicts a graph of pH variations during the reaction of iron-rich dunite and an oxalic acid solution at 20° C. and 60° C. (Example 3)

The reaction of iron-rich dunite and oxalic acid solution was investigated to elucidate the interaction mechanism between the two in carbon mineralization. Test samples were prepared by adding 10 g of iron-rich dunite powder (obtained from NorthernWestStuff) to 105 mL 1 M oxalic acid solution. Samples were tested at reaction temperatures of 20° C. and 60° C. Again, the lower temperature is representative of those encountered during potential ex situ oxalatization applications, and the higher temperature is representative of those encountered during in situ geological subsurface carbon mineralization applications. The pH of the solution was monitored for 12 hours, as shown in FIG. 10. Then, the solids and supernatant of the reaction solution were separated by filtering with 0.2 μm opening nylon membrane filter, and the solids were further dried in a 60° C. vacuum oven for three days.

Figure 2:
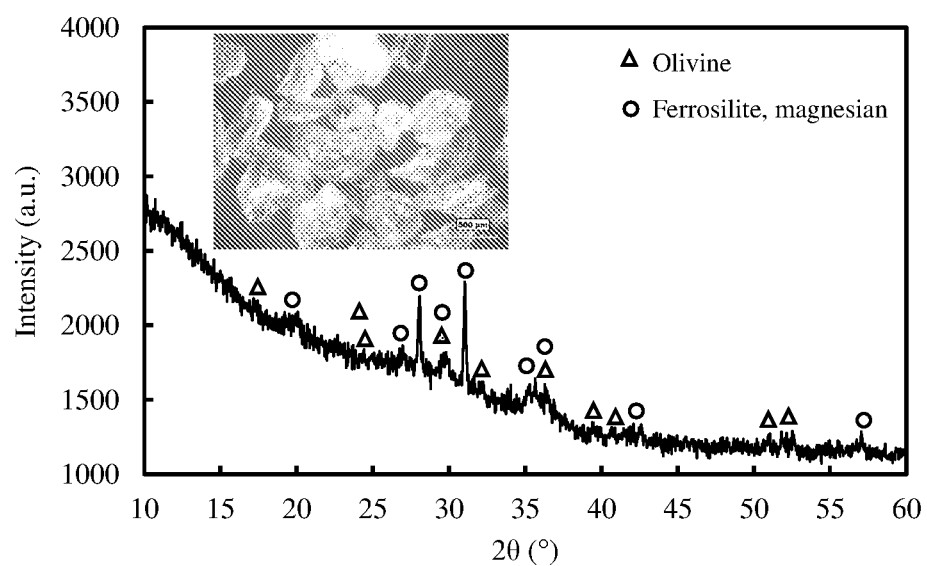
FIG. 2 provides a graph of the XRD pattern of iron-rich dunite, as described in Example 1.
Figure 11:
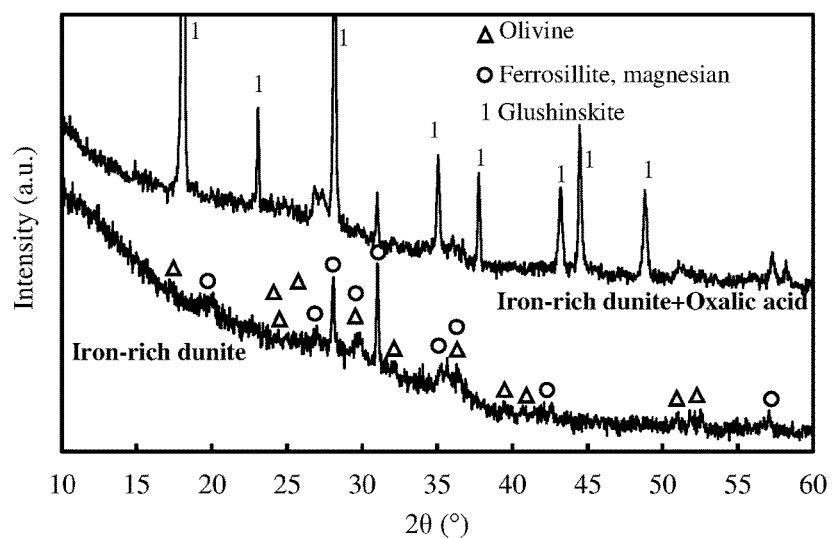
FIG. 11 provides a graph of the XRD pattern of iron-rich dunite before and after interaction with the oxalic acid solution as described in Example 3.
Figure 12:
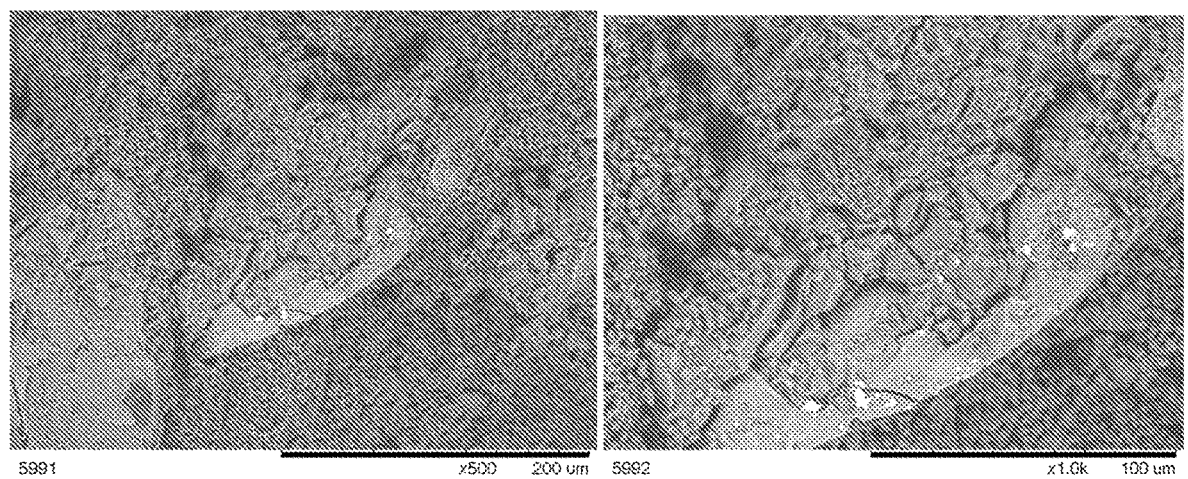
FIG. 12 shows SEM images at 500× (left) and 1,000× (right) of the product obtained from the reaction of iron-rich dunite and oxalic acid solution (Example 3)

The reaction yielded a solid product, which was subjected to further testing. In one of those tests, XRD was carried out by a PANalytical X'Pert Pro Multi-Purpose Diffractometer and compared to the iron-rich dunite XRD obtained in Example 1. FIG. 11 shows the reaction product's XRD pattern as compared to the iron-rich dunite XRD pattern from FIG. 2. SEM images were also taken of the resulting solid and are provided in FIG. 12. It was determined from these results that the reaction product was the same (i.e., glushinskite) as that obtained from the dunite oxalatization described in Example 2.

Moreover, there was a weight gain of 5.7 g for the "iron-rich dunite" from oxalic acid solution after 24 hours, due to the formation of glushinskite. Given that there was 23% MgO in the iron-rich dunite (see Table 1), the weight gain suggested a conversion rate of 92% magnesium oxide to magnesium oxalate dihydrate, which is much faster than carbonation-based mineralization reactions of the same minerals in the relevant environment.

Example 4

Carbon Mineralization Through Oxalatization of Basalt

Figure 3:
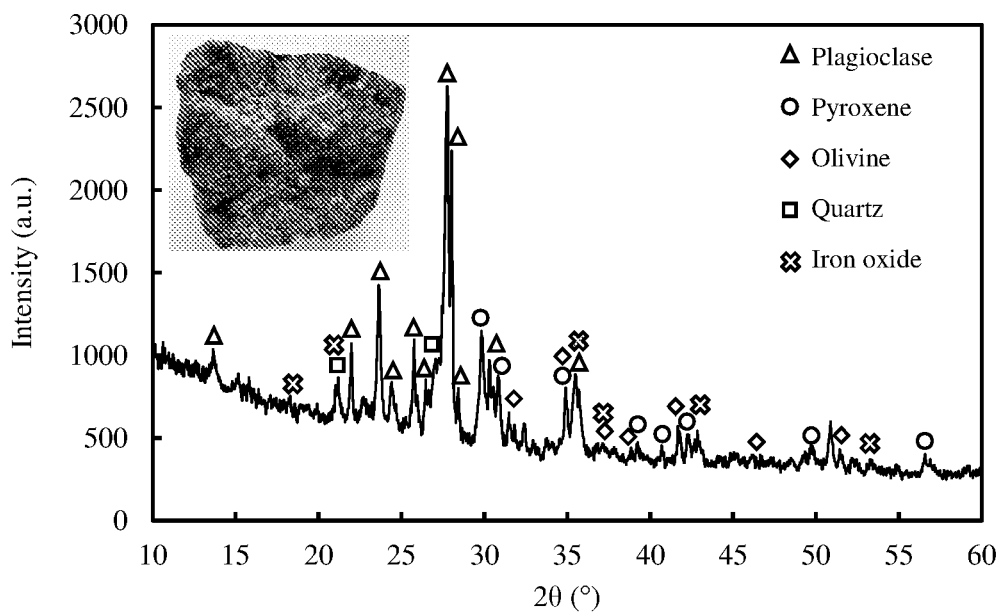
FIG. 3 is a graph of the XRD pattern of basalt, as described in Example 1.
Figure 13:
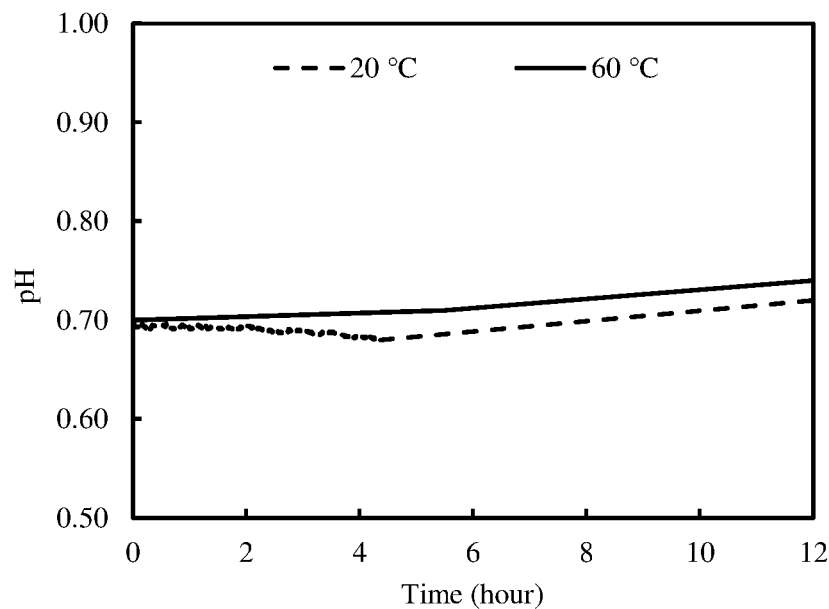
FIG. 13 depicts a graph of pH variations during the reaction of basalt and an oxalic acid solution at 20° C. and 60° C. (Example 4)

The reaction of basalt (mafic as opposed to ultramafic as in Examples 3 and 4) and an oxalic acid solution was also investigated to elucidate the interaction mechanism between the two in carbon mineralization. Test samples were prepared by adding 10 g of basalt powder (obtained from Beakers World) to 105 mL 1 M oxalic acid solution. Samples were tested at reaction temperatures of 20° C. and 60° C. to represent the previously discussed application temperature differences. The pH of the solution was monitored for 12 hours, as shown in FIG. 13. It can be seen that basalt reacted with the oxalic acid solution more slowly than dunite or iron-rich dunite did. This could be attributed to basalt containing lower levels of the necessary reaction components (i.e., olivine, pyroxene, and iron oxide; see FIG. 3 and Table 1).

Figure 14:
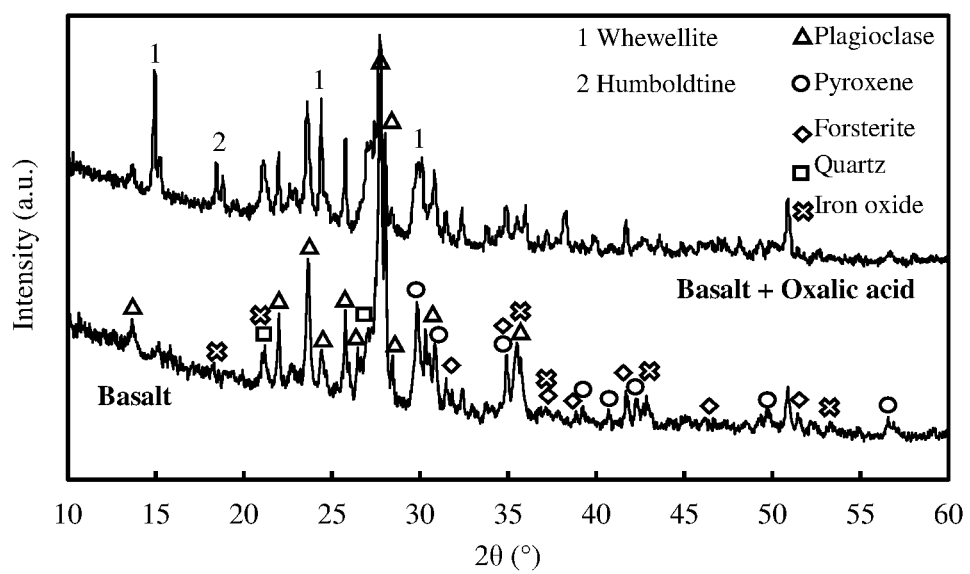
FIG. 14 provides a graph of the XRD pattern of basalt before and after interaction with the oxalic acid solution as described in Example 4.
Figure 15:
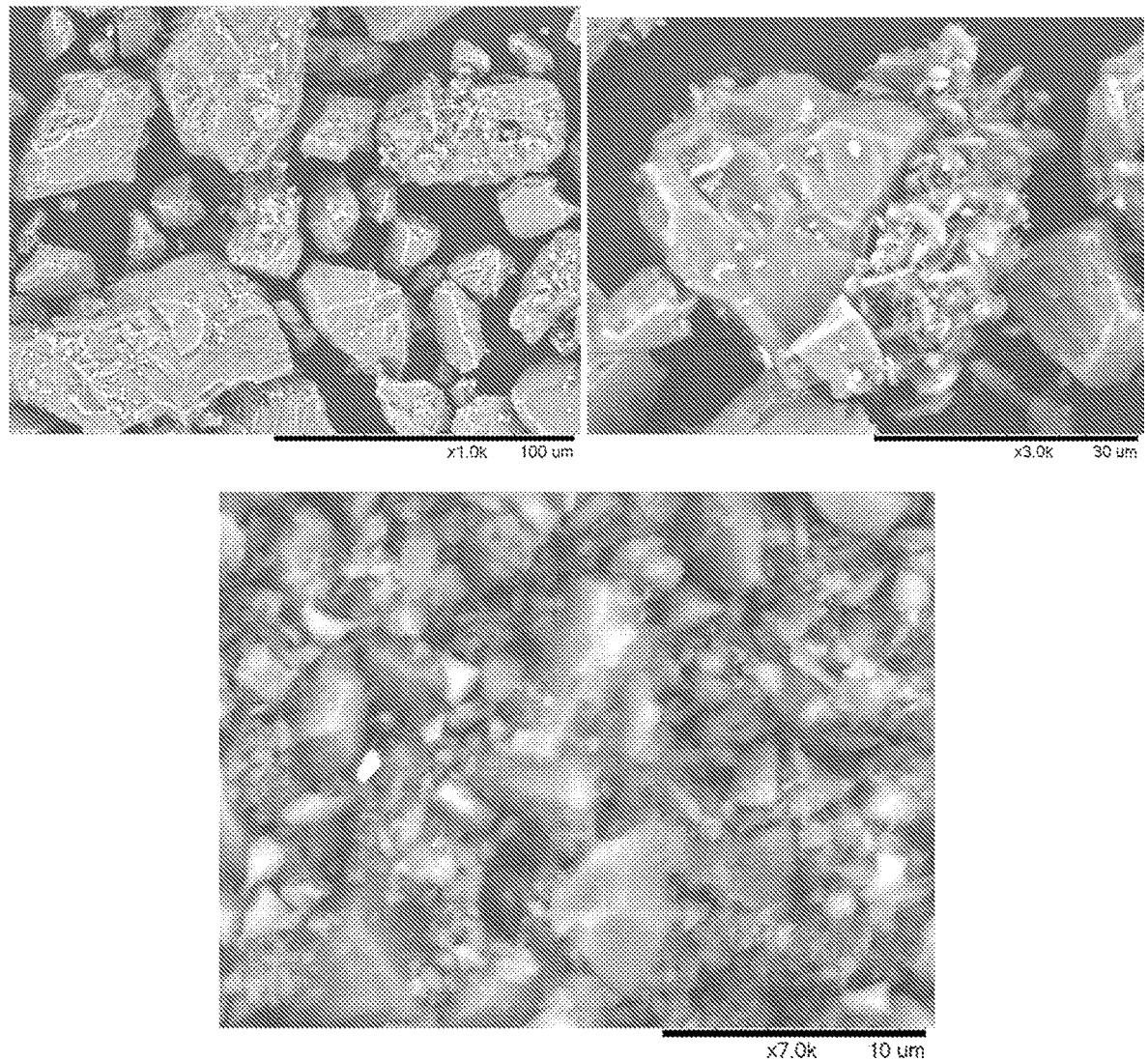
FIG. 15 shows SEM images at 1,000× (top left), 3,000× (top right), and 7,000× (bottom) of the products obtained from the reaction of basalt and an oxalic acid solution (Example 4)

The reaction yielded a solid product, which was subjected to further testing. In one of those tests, XRD was carried out by a PANalytical X'Pert Pro Multi-Purpose Diffractometer and compared to the basalt XRD obtained in Example 1. FIG. 14 shows the product's XRD pattern as compared to the basalt XRD pattern from FIG. 3. SEM images were also taken of the resulting solid and are provided in FIG. 15. Based on the XRD data and SEM images, the major products precipitated were whewellite ($CaC_2O_4 \cdot H_2O$) and humboldtine ($Fe^{2+}C_2O_4 \cdot 2H_2O$).

Figure 16:
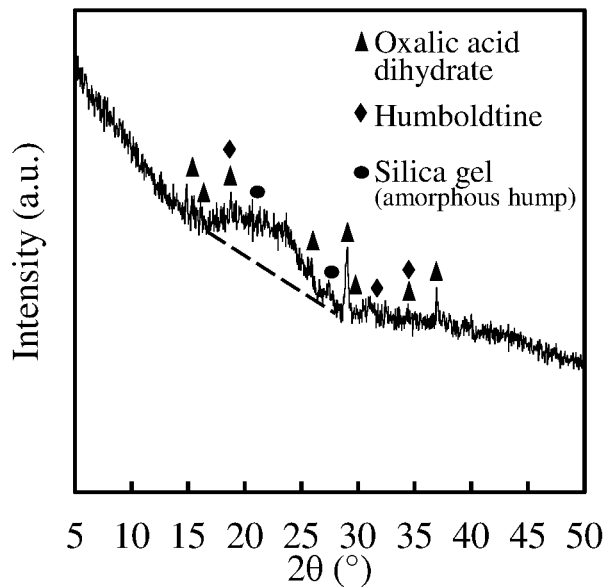
FIG. 16 is a graph of the XRD pattern generated to confirm the presence of suspended amorphous silica in the reaction solution (Example 4)

Other than whewellite and humboldtine, another major product was amorphous silica, which was suspended in the supernatant, separated from the reaction solution due to its nano-scale size. To confirm that it was silica, the supernatant was oven dried at 60° C. to obtain a solid that should include oxalic acid dihydrate and silica. Isopropanol was used to dissolve the oxalic acid dihydrate from the solid, and the remainder of the solid was filtered with a 0.2-μm opening, nylon membrane filter and dried in a 60° C. oven. The oven-dried solid was examined by a PANalytical X'Pert Pro Multi-Purpose Diffractometer, and its XRD pattern (FIG. 16) showed a small amount of humboldtine and some oxalic acid dihydrate leftovers were present. The amorphous silica hump was also clearly observed.

Figure 17:
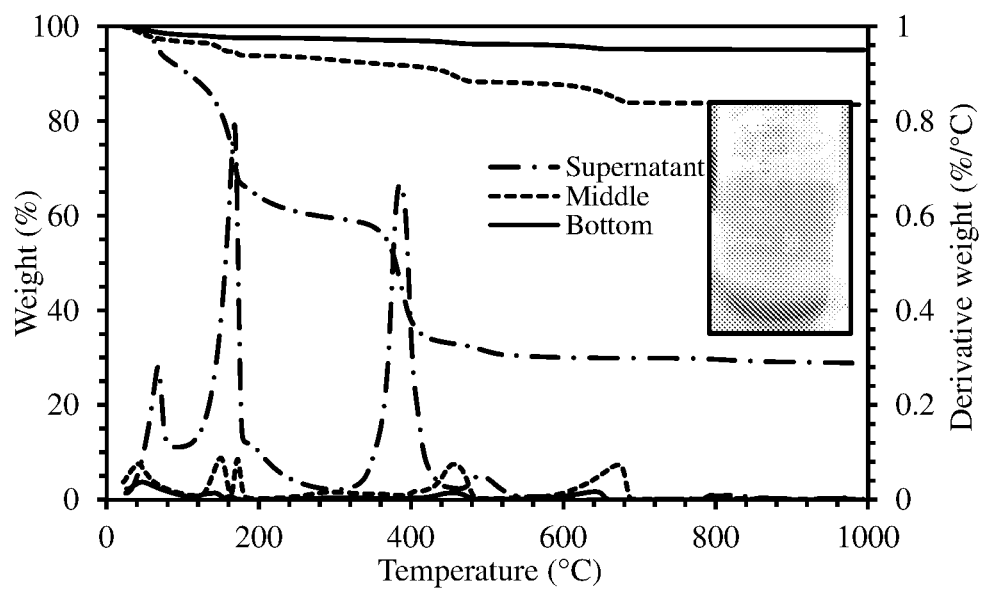
FIG. 17 depicts the thermogravimetric analysis curves of the solids from the supernatant, middle, and bottom portions of the aqueous basalt+oxalic acid solution (Example 4).

Thermogravimetric analysis was carried out on the solids obtained from the supernatant, middle, and bottom portions of the basalt+oxalic acid aqueous reaction solution. The three portions were separated and acquired from the reaction solution by the means of centrifuging at 3,500 rpm for 1 hour by a TC-Spinplus-6 Centrifuge, filtering by 0.2-μm opening, nylon membrane filter, and drying in a 60° C. vacuum oven. The resulting TG/DTG curves (FIG. 17) manifest the existence of $CaC_2O_4 \cdot H_2O$ and $Fe^{2+}C_2O_4 \cdot 2H_2O$ in basalt, which could be thermally dehydrated and decomposed following Equations (6a), (6b), (6c), (7a), and (7b). Combined with the above XRD analyses, it was concluded that the solids from the supernatant were oxalic acid dihydrate, silica, and humboldtine. The solids from middle portion were primarily whewellite along with a small amount of oxalic acid dihydrate, while the solid in the bottom portion was dominated by unreacted dunite and small amounts of oxalic acid dihydrate and whewellite.

$$CaC_2O_4 \cdot H_2O \xrightarrow{\Delta} CaC_2O_4 + H_2O\uparrow \quad (@100\text{-}200° C.) \quad (6a)$$

$$CaC_2O_4 \xrightarrow{\Delta} CaCO_3 + CO\uparrow \quad (@400\text{-}500° C.) \quad (6b)$$

$$CaCO_3 \xrightarrow{\Delta} CaO + CO_2\uparrow \quad (@600\text{-}700° C.) \quad (6c)$$

$$Fe^{2+}C_2O_4 \cdot 2H_2O \xrightarrow{\Delta} Fe^{2+}C_2O_4 + 2H_2O\uparrow \quad (@180\text{-}210° C.)) \quad (7a)$$

$$Fe^{2+}C_2O_4 \xrightarrow{\Delta} FeO + CO\uparrow + CO_2\uparrow \quad (@300\text{-}450° C.)) \quad (7b)$$

Moreover, there was a weight gain of 4 g for basalt from oxalic acid solution after 1 week due to the formation of whewellite and humboldtine. It was noticed that the total weight gain of basalt was smaller when compared to the respective weight gains of the ultramafic rocks of dunite (7.2 g) and iron-rich dunite (5.7 g). Regarding the overall conversion rate, given that there was 5.8% CaO and 9.2% FeO in the basalt (Table 1), the weight gain suggested an overall conversion rate of 88% metal oxides to oxalate hydrates, which is much faster than carbonation-based mineralization reactions of the same minerals in relevant environment.

We claim:

1. A mineralization method comprising contacting oxalic acid with a component chosen from non-carbonate rocks, non-carbonate minerals, or mixtures thereof under conditions to cause formation of one or both of a metal oxalate or metal oxalate hydrate, wherein:
    said non-carbonate rocks comprise less than about 40% by weight of metal carbonates and are chosen from basalt, peridotite, or mixtures thereof;
    said non-carbonate minerals comprise less than about 40% by weight of metal carbonates and are chosen from plagioclase, olivine, pyroxenes, amphiboles, glauconite, dunite, or mixtures thereof.

2. The method of claim 1, wherein said contacting comprises injecting said oxalic acid into a rock formation comprising said component.

3. The method of claim 2, wherein said rock formation comprises a subsurface formation.

4. The method of claim 2, wherein said contacting comprises co-injecting oxalic acid and liquified $CO_2$.

5. The method of claim 1, wherein said contacting comprises mixing said oxalic acid with said component.

6. The method of claim 5, wherein said component is present in mine tailings, well drilling dirt, or a mixture thereof.

7. The method of claim 1, wherein said oxalic acid is present in an aqueous solution.

8. The method of claim 1, wherein said component comprises a metal oxide, a metal oxide in a silicate, or mixtures thereof.

9. The method of claim 8, wherein:
    said non-carbonate rock comprises at least about 20% by weight metal oxide; and
    said non-carbonate mineral comprises at least about 30% by weight metal oxide.

10. The method of claim 8, wherein said metal oxide comprises an oxide of a metal chosen from alkaline earth metals, transition metals, or mixtures thereof.

11. The method of claim 8, wherein said metal oxide comprises an oxide of a metal chosen from magnesium, iron, calcium, or mixtures thereof.

12. The method of claim 1, wherein said metal oxalate hydrate comprises magnesium oxalate dihydrate, ferrous oxalate dihydrate, calcium oxalate monohydrate, or mixtures thereof.

13. The method of claim 1, wherein said component comprises at least about 20% by weight magnesium oxide, at least about 8% by weight iron oxide, or both, based on the total weight of the component taken as 100% by weight.

14. The method of claim 1, wherein said component has an initial quantity of total metal oxides and at least about 75% by weight of said initial quantity is converted to one or both of said metal oxalate or metal oxalate hydrate.

15. The method of claim 14, wherein at least about 75% by weight of said initial quantity is converted to one or both of said metal oxalate or metal oxalate hydrate within about 30 days of said contacting.

16. The method of claim 1, wherein said component has a quantity of magnesium oxide and at least about 50% by weight of said quantity of magnesium oxide is converted to one or both of magnesium oxalate or magnesium oxalate hydrate.

17. The method of claim 16, wherein at least about 50% by weight of said quantity of magnesium oxide is converted to one or both of said magnesium oxalate or magnesium oxalate hydrate within about 7 days of said contacting.

18. The method of claim 1, wherein the molar ratio of oxalic acid to total metal oxide in the component is about 1:20 to about 1:1.

19. The method of claim 1, wherein said oxalic acid is produced from:
   $CO_2$ captured from air;
   $CO_2$ captured from point sources;
   low-concentration $CO_2$ from point sources directly;
   biomass whose growth removed $CO_2$ from air; or
   mixtures thereof.

20. The method of claim 1, wherein said contacting results in double the number of carbon atoms being consumed per metal atom when compared to the number of carbon atoms consumed per metal atom to form a metal carbonate.

21. A system for carrying out the method of claim 1.

22. The reaction product formed by the method of claim 1.

* * * * *